Feb. 2, 1926.
A. LIND
1,571,421
STARTING AND STEERING DEVICE FOR BOAT PROPELLING APPARATUS
Filed May 15, 1924    3 Sheets-Sheet 1
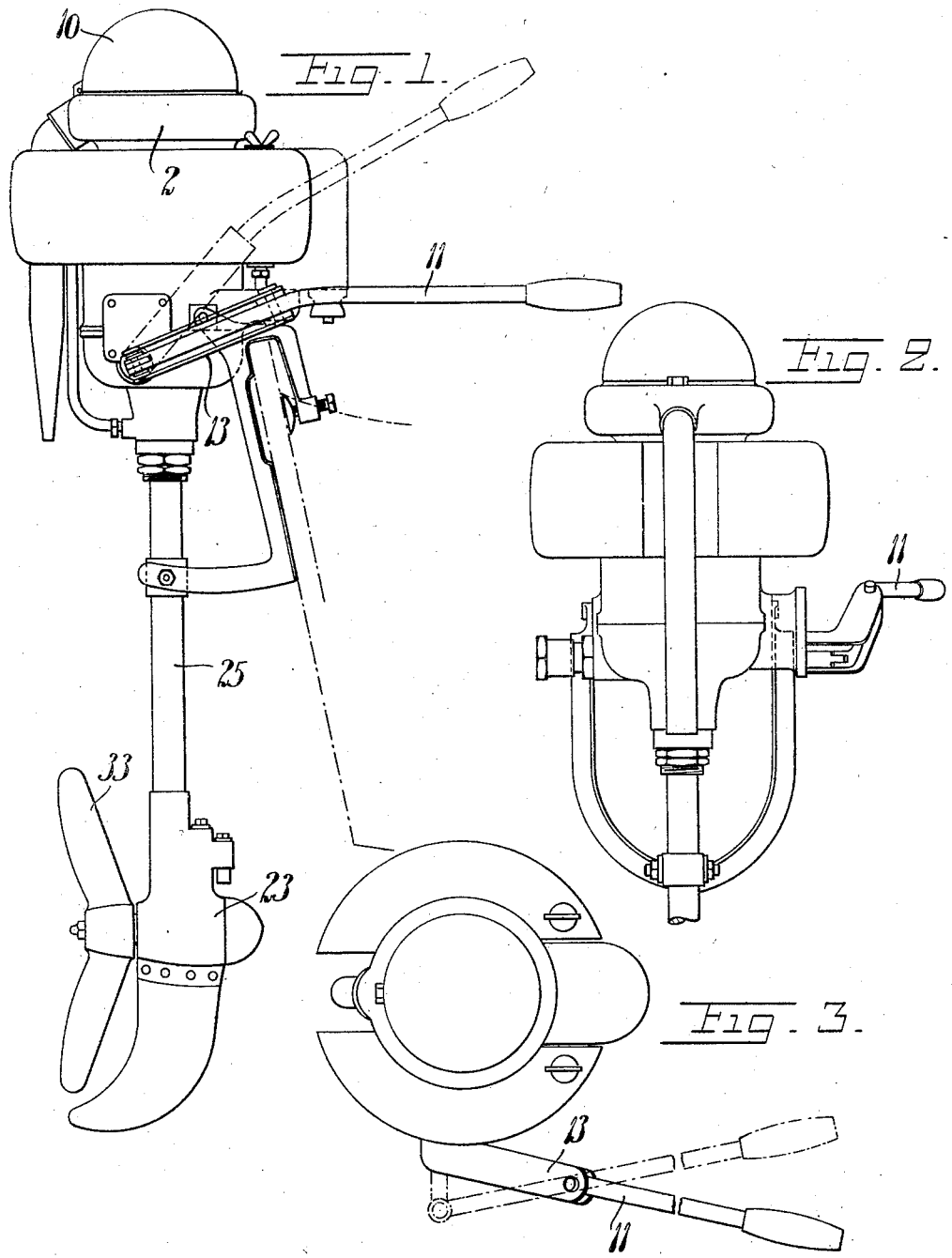

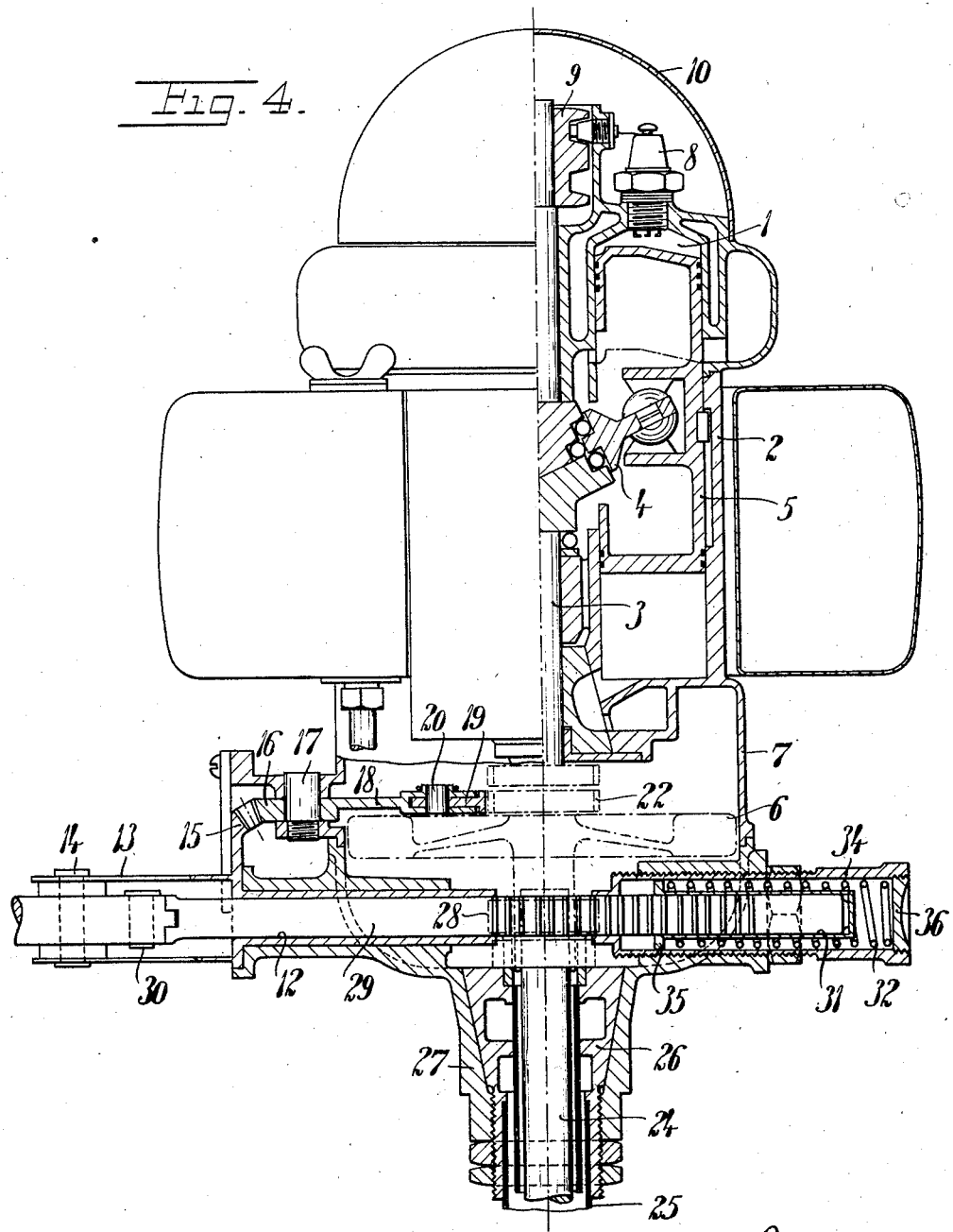

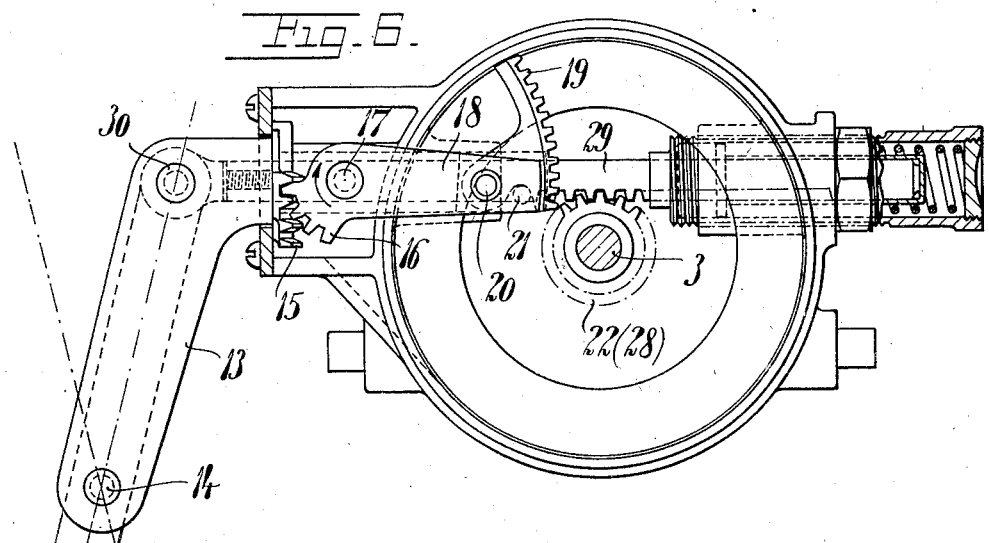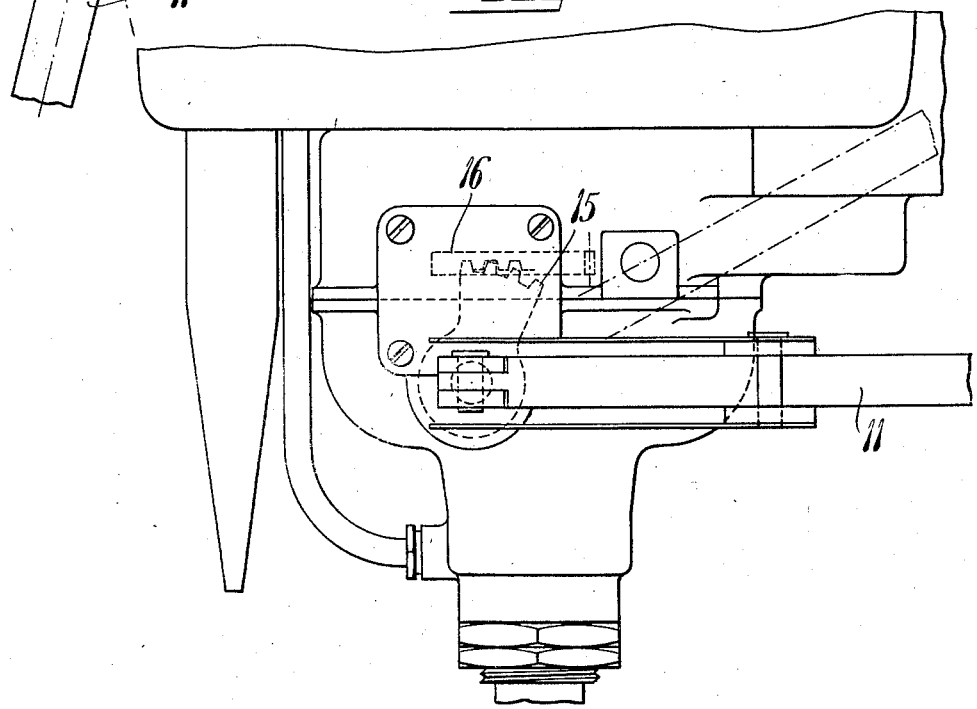

Patented Feb. 2, 1926.

1,571,421

UNITED STATES PATENT OFFICE.

ARVID LIND, OF STOCKHOLM, SWEDEN.

STARTING AND STEERING DEVICE FOR BOAT-PROPELLING APPARATUS.

Application filed May 15, 1924. Serial No. 713,598.

*To all whom it may concern:*

Be it known that I, ARVID LIND, a citizen of the Kingdom of Sweden, residing at Stockholm, Sweden, have invented new and useful Improvements in Starting and Steering Devices for Boat-Propelling Apparatus, of which the following is a specification.

This invention relates to an improved starting and steering device for propelling mechanisms for motor boats.

Propelling mechanisms for motor boats comprising an explosion motor, a screw propeller and suspending means for detachably securing the apparatus outside the bulkwark of a boat are well known. The starting of such apparatus is generally effected by means of a handle secured to the flywheel by means of which the flywheel and the motor shaft can be rotated. Such starting is, however, troublesome and also somewhat dangerous for the operator inasmuch as the flywheel and its upwardly directed handle are disposed at the top without any cover. It has also been proposed to use a single tiller for the starting as well as the steering of such apparatus but the known devices of this kind have not been reliable and their operation has been troublesome so that they have not found any use in practice.

This invention relates to a starting and steering device for propelling mechanisms for motor boats of the last-mentioned kind, which is simple in its construction and reliable in its working. The invention consists, chiefly, in that the tiller is journalled in a member which is rotatable by means of the tiller and by means of a gear is brought into a temporary engagement with the motor shaft for the starting of the motor, while the steering is obtained by rotating the tiller in relation to said member, the tiller actuating in the latter case by means of a second gear the steering means. This starting and steering device is, preferably, provided below the cylinder block and also the flywheel of the motor is, preferably, disposed below the cylinder block, so that all rotating parts can be wholly covered and thus all risk for the operator be avoided.

In the accompanying drawings I have shown one embodiment of my invention. Fig. 1 is a side view of a boat propelling mechanism having a starting and steering device according to the invention. Fig. 2 is a view from behind of the upper part and Fig. 3 is a top view thereof. Fig. 4 shows a partly sectional side view of the motor and the starting and steering device on a larger scale. Fig. 5 shows a view from behind of the starting and steering device and Fig. 6 shows a partly sectional top view thereof.

The invention is shown as applied to a boat propelling mechanism of the type having a plurality of axially disposed cylinders 1, the pistons of which are connected to a wabbling driving disc 4 on a shaft 3 journalled centrally in the cylinder block 2, but this is not essential for the invention which is applicable to all boat propelling mechanisms which consist of an explosion motor, a screw propeller and supporting means forming together a unit which is adapted to be secured outside the bulwark of a motor boat. The flywheel 6 of the motor is secured to the motor shaft 3 below the cylinders and is wholly enclosed by a mantle 7 formed by the lower part of the cylinder block and also enclosing the means for starting, steering and back running described herebelow. The spark plugs 8 provided at the top of the cylinders and the commutator 9 which is secured to the upper end of the motor shaft and in well-known manner controls the supply of the igniting current from a magneto to the spark plugs of the cylinders are covered by a half-spherical mantle 10 secured to the upper end of the cylinder block. All parts which are moveable or liable to get damaged are thus in the present propelling apparatus wholly protected whereby the reliability of the apparatus is increased and also the risk for the operator, who in apparatus of this kind often is a child or an unpractised person, is greatly reduced.

The means for starting and steering are constructed as follows. In the mantle 7 a sleeve 12 is rotatably journalled, said sleeve having outside the mantle 7 a furcated extension 13, which forms an angle with the axis of the sleeve and in which the tiller 11 is pivoted on a pin 14. The sleeve 12 is provided with a toothed sector 15 which engages another toothed sector 16 at one end of a lever 18 which is pivoted on a pin 17 in the mantle 7 and at its other end supports a toothed sector 19. The latter sector is pivoted on a pin 20 secured to the lever 18 and can be swung in one direction on said pin against the action of a spring (not shown) while its movement in the other direction is prevented by a pin 21 secured to the lever 18. The toothed sector 19 forms a bow having its centre in the centre of the pin 17 when the sector is in its normal position in which it engages the pin 21. The sector 19 is adapted to operate a pinion 22 secured to the motor shaft but is normally out of engagement with said pinion.

When the motor is started, the tiller is first swung vertically upwards whereby the sleeve 12 is rotated and by means of the sectors 15, 16 the lever 18 is swung in the direction shown by the arrow in Fig. 6. The toothed sector 19 now hits the pinion 22 and is swung backwards in relation to the lever 18 so much that its teeth jump over the teeth of the pinion 22 without rotating the latter and this operation is continued until the toothed sector 19 has fully passed by the pinion 22 whereupon the sector 19 is returned to normal position in relation to the lever 18 by its spring. The tiller 11 is now rapidly depressed and by this operation the lever 18 is swung in opposite direction to the arrow shown in Fig. 6. The toothed sector 19 now bears against the pin 21 so that it cannot swing in relation to the lever 18 and its teeth engage the pinion 22 and rotate it together with the shaft of the motor so that the latter is started.

For effecting steering and back running in a simple manner the hub 23 of the screw propeller is in well-known manner connected to a sleeve 25 surrounding the lower part 24 of the motor shaft and rotatable together with said sleeve. At the upper end of said sleeve 25 a conical member 26 is secured, said member being journalled in a corresponding seat formed by a downwardly extending portion 27 of the mantle 7. At the upper end of the member 26 a pinion 28 is secured engaging a rack 29 which passes through the sleeve 12 and is connected at one end by means of a pin 30 to the shorter arm of the tiller 11 which is surrounded by the furcated portion 13. The other end of the rack 29 is surrounded by a sleeve 31 the inner end of which is provided with a flange 35 forming a support for one end of a spring 32 surrounding the sleeve 31. The outer end of said spring bears against a screw cover 36 on a sleeve 34 which is screwed into the mantle 7. Normally the spring 32 holds the sleeve 31 and the rack pressed so much to the left that the flange 35 bears against the inner bottom of the screw sleeve 34 and the tension of the spring is so adjusted that it fully counteracts the torque which the screw propeller exerts on the sleeve 25 on running. If the tiller 11 is left free during running the propeller hub, therefore, automatically adjusts itself into a position, in which the right end of the rack 29 presses against the sleeve 31 and can move the sleeve so that its flange 35 is moved out of engagement with the inner bottom of the screw sleeve 34. By adjusting the screw sleeve said position can be so adjusted that the screw propeller 33 normally is held in a position for running straight forward.

Steering is effected by turning the tiller 11 horizontally in either direction. In this operation the tiller is swung about the pin 14 and actuates the rack 29 which operates the pinion 28, the sleeve 25 and the propeller hub so that steering is effected. When back running shall take place the tiller is swung horizontally so much that the propeller hub is rotated 180° from the normal position for running straight forward.

Starting for back running is effected in such manner that the tiller 11 first is swung horizontally so that the propeller hub is rotated 180° whereupon the tiller 11 in the manner above described is moved up and down in vertical direction. For preventing the rack 29 from resisting the vertical movements of the tiller it can be carried out as a round rack or be provided with a rotatable joint so that the portion thereof which engages the pinion does not need partake in the vertical movements of the tiller 11.

It is evident that the invention is not limited to the constructional details above described but the constructional features of the invention may be varied according to the circumstances and the type of boat driving apparatus to which it is applied.

What I claim is:

1. A starting and steering device for boat propelling apparatus, comprising a tiller adapted to swing in two directions forming an angle with each other, a member adapted to be rotated by the tiller when the latter is moved in one direction and to remain inoperative when the tiller is moved in the other direction, a toothed sector on said member, an intermediate lever engaged by said sector, a toothed sector pivoted on said lever, a motor shaft, a pinion on the latter adapted to be engaged by the last mentioned toothed sector for starting the motor when the tiller is swung in one direction, a sleeve surrounding the motor shaft, a propeller hub on the lower end of the sleeve, a pinion secured to the upper end of said sleeve, a rack engaging said pinion and secured to the tiller so as to be operated by the latter for turning the propeller hub when the tiller is swung in the other direction.

2. A starting and steering device for boat propelling apparatus, comprising a rotatable sleeve, an extension on the latter forming an angle with the axis of the sleeve, a tiller supported in said extension adapted to rotate the sleeve, a pin connecting the tiller to the extension whereby the tiller may be swung independently of the sleeve, a motor shaft, a propeller hub rotatable about the latter, means for transmitting the rotation of the sleeve to said shaft for starting the motor, and means for transmitting motion from the tiller to the propeller hub for steering purposes.

3. A starting and steering device for boat propelling apparatus, comprising a rotatable sleeve, a tiller pivoted in said sleeve, a rack having one end journalled in said sleeve and connected to the tiller, a screw sleeve surrounding the other end of the rack, and a spring in said screw sleeve actuating the rack.

4. A boat propelling apparatus, comprising a suspension means, a motor block journalled in said suspension means, a vertical motor shaft, a sleeve surrounding said shaft, a propeller hub secured to the lower end of said sleeve, a tiller adapted to swing in two directions forming an angle with each other, means for transmitting motion from the tiller to the motor shaft for starting the motor when the tiller is swung in one direction, and means operated by the tiller for rotating the propeller hub in relation to the motor block for steering purposes when the tiller is swung in the other direction.

5. A boat propelling apparatus, comprising a suspension means, a motor block journalled in the latter, a housing below the motor block, a sleeve journalled in said housing, a tiller journalled in said sleeve and adapted to rotate the latter about its longitudinal axis, said tiller being also movable independently of the sleeve, a vertical motor shaft, a propeller hub rotatable in relation to the motor block, means for transmitting motion to the motor shaft from the sleeve supporting the tiller, and means for transmitting motion from the tiller to the propeller hub independently of the sleeve supporting the tiller.

In testimony whereof I have signed my name.

ARVID LIND.